Feb. 14, 1939.  T. H. SLOAN  2,146,773
STENCILING APPARATUS
Original Filed July 10, 1936  4 Sheets—Sheet 1

Feb. 14, 1939.  T. H. SLOAN  2,146,773

STENCILING APPARATUS

Original Filed July 10, 1936  4 Sheets—Sheet 2

INVENTOR.
T. H. Sloan
BY Rule & Hoge
ATTORNEYS.

Feb. 14, 1939.                T. H. SLOAN                2,146,773
                          STENCILING APPARATUS
               Original Filed July 10, 1936    4 Sheets-Sheet 3

INVENTOR.
T. H. Sloan
BY
Rule & Hoge
ATTORNEYS.

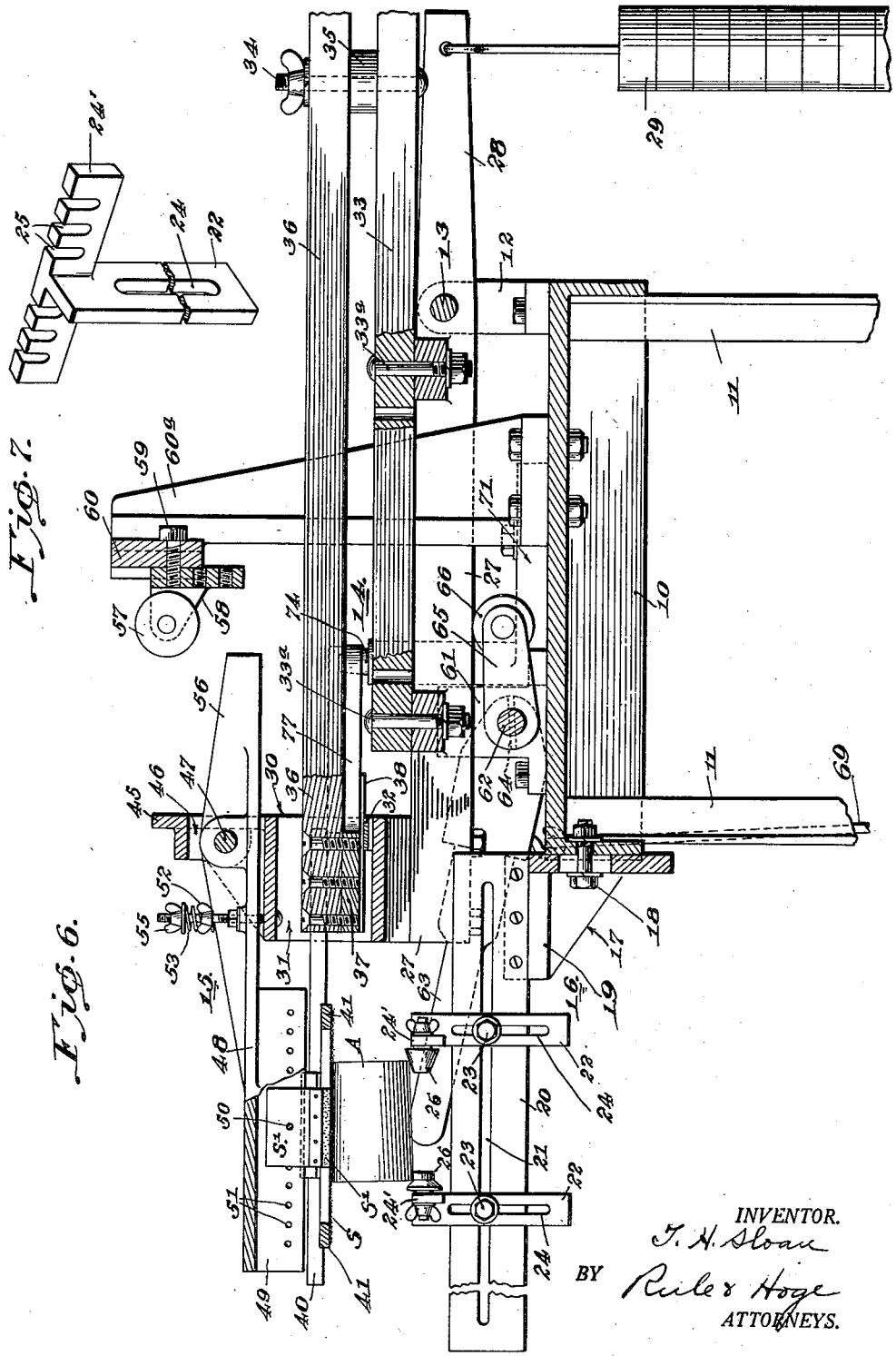

Patented Feb. 14, 1939

2,146,773

UNITED STATES PATENT OFFICE 2,146,773

STENCILING APPARATUS

Theodore H. Sloan, Charleroi, Pa., assignor to Simplex Engineering Company, a corporation of Delaware Application July 10, 1936, Serial No. 89,973
Renewed May 12, 1938

19 Claims. (Cl. 101—124)

The stenciling apparatus comprising the present invention is primarily adapted for use in applying a vitreous enamel composition or paint to articles of glassware such as bottles, jars and the like, and other articles of a vitreous or ceramic nature in the lettering or decorating thereof by a stenciling process.

The principal object of the invention is to provide an apparatus which will generally improve and simplify the operation of applying the vitreous enamel composition to such articles; which will materially increase the quantity of work performed as well as improving the quality and uniformity thereof; and which will lessen the labor and skill otherwise required in performing the same type of stenciling operations.

The invention is embodied in an apparatus of the type employing a stencil screen capable of movement relative to the article undergoing decoration and having permeable portions through which the enamel is transferred to the article by the spreading action of a squeegee. A further object of the invention is to provide an apparatus of the type referred to in which there is incorporated an improved means for elevating the stencil screen and other decorating instrumentalities from the article holding means to facilitate substitution of the work in the apparatus.

Another object of the invention is to provide an improved automatically operable means for lifting the squeegee from the stencil screen upon elevation of these decorating instrumentalities from the work to permit the squeegee to clear the enamel composition on the screen.

Yet another object of the invention is to provide an apparatus embodying all of the above features which is capable of use in decorating articles having different degrees of peripheral curvature and slope.

In the accompanying drawings:

Fig. 6 is a fragmentary enlarged side elevational view of the apparatus, partly in section, and Fig. 7 is a perspective view of an adjustable article supporting rack employed in connection with the present invention.

The apparatus involves in its general organization a platform or table 10 having supporting legs 11. A pair of upright supports 12, bolted or otherwise secured to the table 10, extend upwardly from the rear corners thereof and support therebetween a transverse horizontal rock-shaft 13.

Figure 4:
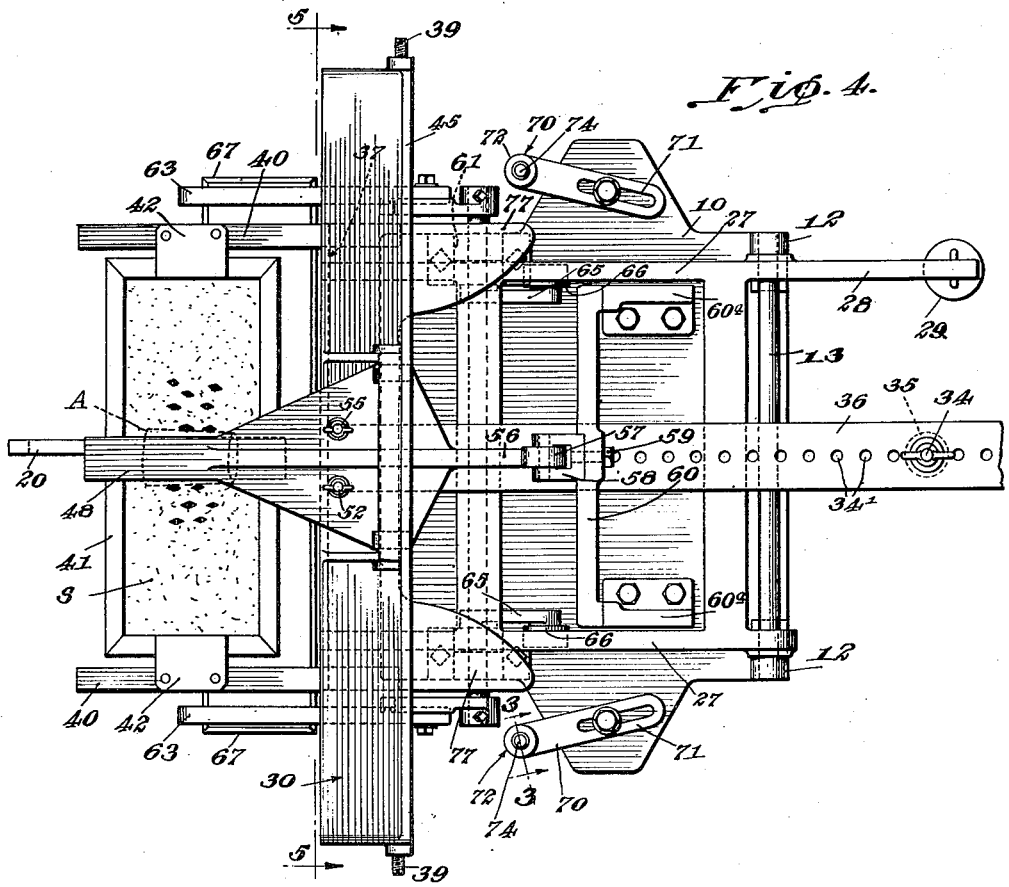
Fig. 4 is a top plan view of the apparatus.

Referring now to Figs. 4 and 6, the rock-shaft 13 extends across the rear edge of the table 10, is substantially coextensive therewith, and rockably supports the inner or rear end of an adjustable center stencil screen assembly 14 best illustrated in Fig. 6.

A squeegee assembly 15, including a squeegee S', is operatively supported upon and carried by the stencil screen assembly 14.

An adjustable article-holder or support 16 (Fig. 6) is secured to the forward edge of the table 10 and occupies a position beneath the stencil screen and squeegee assemblies 14 and 15 respectively, forwardly of the table 10.

The article A to be decorated is rotatably supported in the holder 16 with the surface to be decorated making tangential line contact with the screen S. Toward this end the article support 16 or holder (Fig. 6) includes a casting 17 secured by bolts 18 or the like to the forward edge of the table 10 for vertical adjustment thereon. An integral plate 19 projects forwardly from the casting 17 and is secured to the inner end of and supports an elongated article supporting bar 20. The bar 20 extends forwardly of the apparatus beneath the squeegee S' and stencil screen S. A longitudinal slot 21 is provided in the bar 20 and is substantially coextensive therewith. A pair of article supporting racks 22, one of which is shown in detail in Fig. 7, is carried by the bar 20 and is longitudinally and vertically adjustable thereon by means of nut and bolt assemblies 23 which extend through slots 24 provided in the racks 22 and through the longitudinal slot 21 provided in the bar 20. The racks 22 (Figs. 6 and 7) include integral crossheads 24' having a series of notches 25 formed in the upper edge thereof designed to selectively accommodate a pair of article supporting roller units 26. By proper selection of the notches 25, the center to center distance between the rollers of each pair of units 26 may be varied to handle articles of different diameter. The longitudinal distance between the respective pairs of roller units 26 may be varied by adjustment of the holders 22 longitudinally on the bar 20 to compensate for differences in the length of the articles to be decorated. It will thus be seen that regardless of the diameter or peripheral slope of the surface of the article to be decorated, tangential line contact between this surface and the lower surface of the stencil screen may be effected by making the proper adjustments of the supporting instrumentalities just described.

Referring again to Figs. 4 and 6, wherein the stencil screen assembly 14 is best illustrated, the rock-shaft 13 rockably supports a forwardly extending frame 27 of generally rectangular shape. This frame carries a rearwardly extending arm 28 from which there is suspended a series of removable counterweights 29 for counterbalancing the weight of the frame 27 together with the various instrumentalities carried thereby. In the lowermost position of the stencil screen assembly, the side portions of the frame 27 rest upon and are supported by a pair of bearing blocks 61 clearly shown in Fig. 5 and which will subsequently be referred to.

Bolted or otherwise secured to the frame sides at the forward ends thereof is a relatively heavy casting 30, generally of rectangular formation, provided with an elongated transversely extending rectangular opening 31 (Fig. 5) across the bottom of which extends a slideway 32, the purpose of which will appear presently.

A supporting beam 33 (Figs. 1, 2 and 6) is secured by bolts 33ª to the upper side of the frame 27 centrally thereof and extends rearwardly of the machine, passing over the rock-shaft 13. Pivoted to the beam 33 by means of a nut and bolt assembly 34 adjacent the rear end thereof and spaced therefrom by means of a spacing collar 35, is a forwardly extending radius arm 36 which projects into the rectangular opening 31 provided in the casting 30. The radius arm 36 is provided with a series or row of aligned apertures 34' in which the nut and bolt assembly 34 is selectively receivable to vary the effective length of the arm and the radius of the arc through which it may swing about the pivot 34. The outer end of the radius arm 36 within the opening 31 carries an elongated crosshead 37 (Fig. 5) the length of which is somewhat less than the width of the opening 31. A pair of metal runners 38 (Figs. 5 and 6) designed for sliding movement on the slideway 32 are secured to the lower surface of the crosshead 37, one at each end thereof. The crosshead 37 is, by virtue of the pivotal connection 34 of the radius arm 36, capable of movement within the rectangular opening 31 throughout an arc, the extent of which is limited by means of a pair of adjustable limit stops 39 threadedly received in the opposite side walls of the casting 30.

A pair of stencil screen supporting arms 40 (Figs. 4 and 6) secured to the crosshead 37 at opposite ends thereof, project forwardly therefrom and support therebetween a rectangular, horizontally extending, stencil screen frame 41 which is secured in position by means of brackets 42. The screen S, previously referred to, is formed of silk or any other preferred screen material and has impervious portions and pervious portions, the latter representing the design to be stenciled on the articles. The screen is stretched across the bottom of the frame 41 and is secured thereto in any preferred manner. The screen S is adapted upon oscillation of the radius arm 36 and crosshead 37 to move in its own plane in tractional rolling line contact with the article A undergoing decoration.

Figure 5:
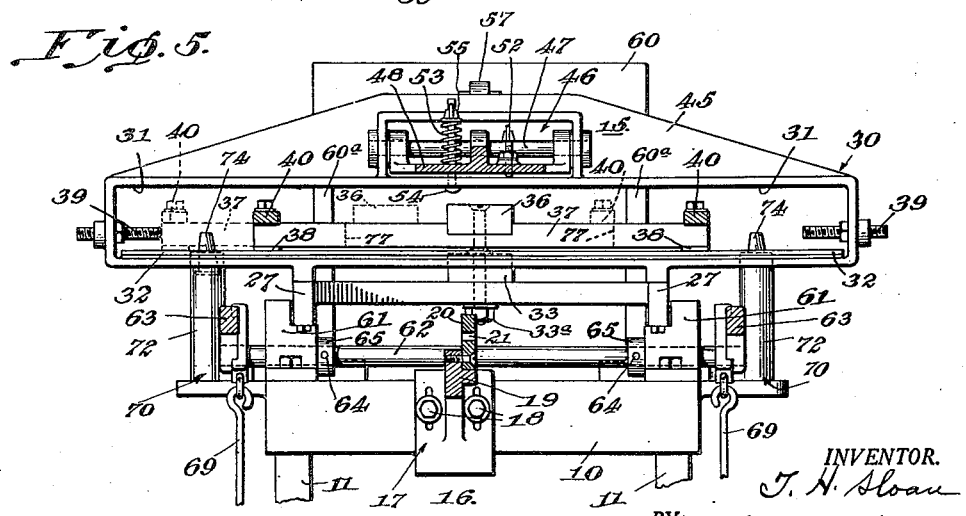
Fig. 5 is a sectional view taken substantially along the line 5—5 of Fig. 4.

Referring now to Figs. 5 and 6 wherein the squeegee assembly 15 is best illustrated, the casting 30 is provided with an upstanding flange 45 extending across the machine and having a central rectangular opening 46. A rock-shaft 47, journalled in bearings in the sidewalls of the opening 46, extends horizontally across the opening and rockably supports a squeegee carrying arm 48. The forward end of the arm 48 is provided with a pair of downwardly extending parallel flanges 49 (Fig. 6) between which the squeegee unit S' is suspended by means of a pin 50 which is selectively receivable in a series of aligned apertures 51 provided in the flanges 49. The squeegee unit S' is thus adjustable longitudinally of the arm 48 in order that in the initial setting up of the apparatus, the same may be brought into register with the pervious portions of the screen S.

In order to initially adjust the squeegee unit S' to the stencil screen S and to regulate the degree of pressure thereon, an adjusting screw 52 passes through the arm 48 and engages the top of the casting 30.

The squeegee supporting arm 48 extends rearwardly of the rock shaft as at 56 and the rear portion thereof is adapted, upon elevation of the stencil screen from the article A undergoing decoration, to engage a roller 57 which is positioned in its path. The roller 57 is rotatably carried by a bracket 58 which is adjustably secured by a bolt 59, or such element, to a crossbar 60 which is supported at its ends from the upper ends of a pair of standards 60ª bolted or otherwise secured to the table 10. Upon engagement of the rear portion 56 of the squeegee supporting arm 48 with the roller 57, the arm 48 is rocked about the rock-shaft 47 in such a manner that the squeegee S' is lifted from the screen S to clear the mass of enamel composition or paint thereon for a purpose subsequently to be described.

A coil spring 53 (Figs. 1, 2 and 5) centered upon a pin 54 passing through the arm 48 and carried by the casting 30 serves to return the squeegee arm to its operative position in contact with the screen upon lowering of the stencil screen assembly 14. A wing nut 55 threaded upon the pin 54 permits adjustment of the tension of the spring 53 and consequently the pressure of the squeegee upon the screen.

Figure 1:
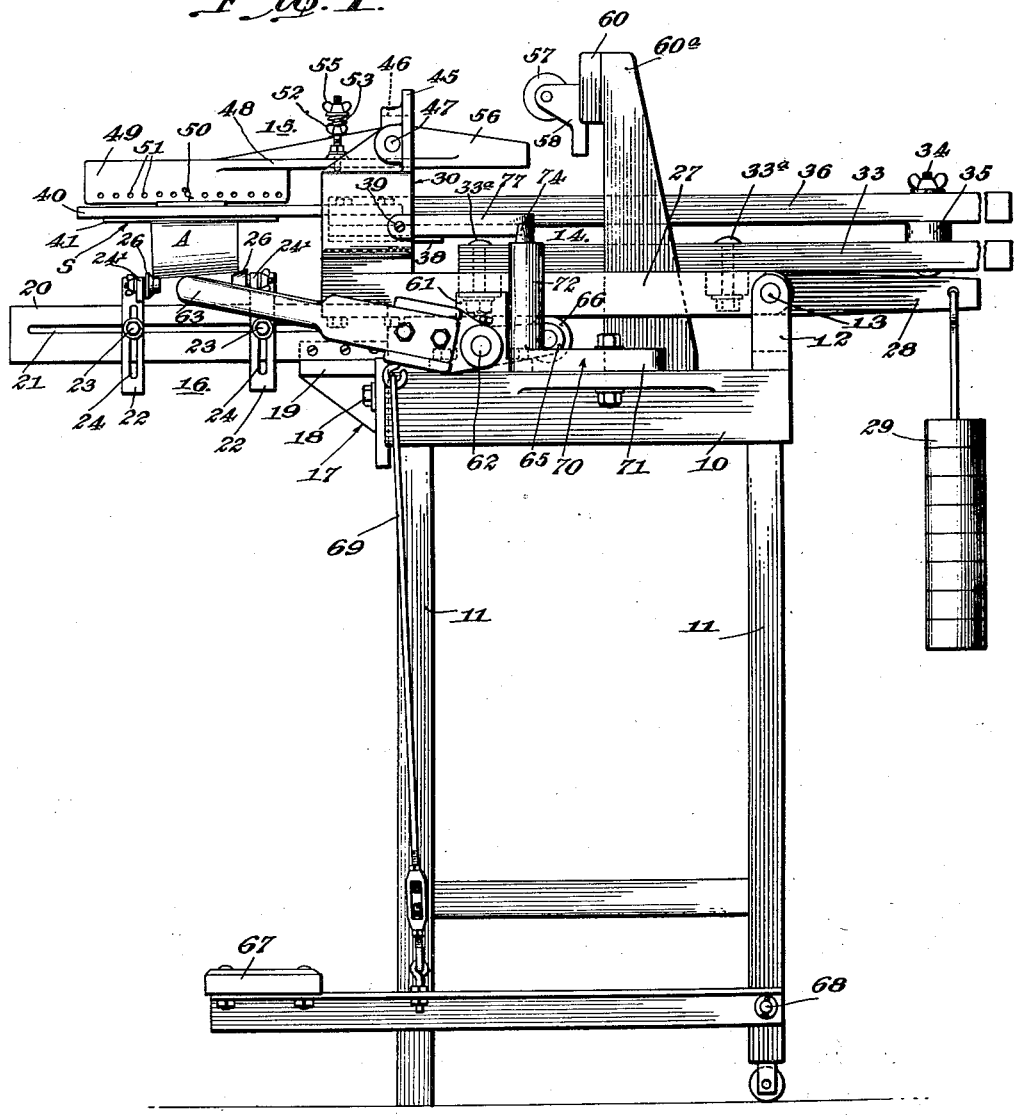
Fig. 1 is a side elevational view of a stenciling apparatus manufactured in accordance with the principles of the invention.
Figure 2:
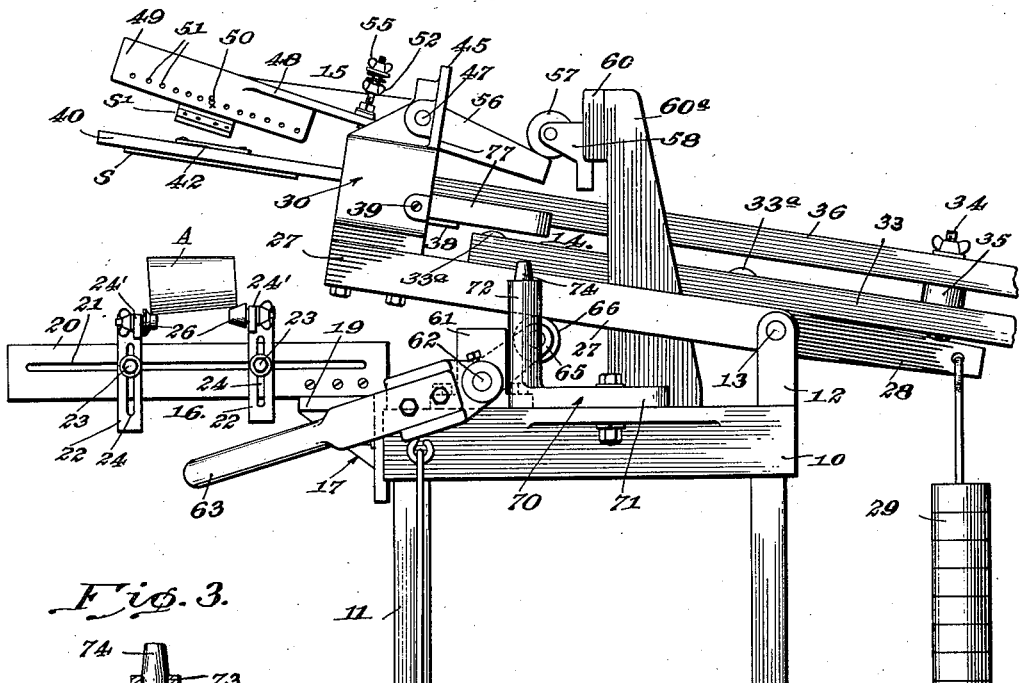
Fig. 2 is a side elevational view similar to Fig. 1 showing the apparatus in non-decorating position.

Referring to Figs. 2 and 5, in order to elevate the stencil screen assembly 14 from contact with the article A undergoing decoration, the bearing blocks 61, previously referred to, which support the side portions of the frame 27, serve to support therebetween a transversely extending rock-shaft 62 which is rockably journalled in the bearing blocks 61. The outer ends of the shaft 62 extend through the blocks 61 and project laterally beyond the sides of the table 10. Each end of the shaft 62 carries a manually operable lever 63 which extends forwardly of the machine to a point accessible by the operator of the machine. Positioned directly beneath the side portions of the frame 27 and secured by a pin 64 to the rock-shaft 62 is a pair of levers 65 carrying rollers 66 at their outer ends. The function of the levers 65 and rollers 66 is to elevate the entire stencil screen assembly upon manual depression of either of the levers 63. Toward this end, upon depression of either of the levers 63, the rollers 66 engage the underneath side of the side portions of the frame 27 and elevate the frame by a camming action. As an alternative means for elevating the stencil screen assembly 14, a foot treadle 67 pivoted as at 68 to the rear supporting legs 11 adjacent the bottom thereof is connected by means of adjustable links 69 to the levers 63. The treadle 67 extends forwardly of the apparatus as shown in Figures 1 and 2 and is readily accessible by the operator.

Figure 3:
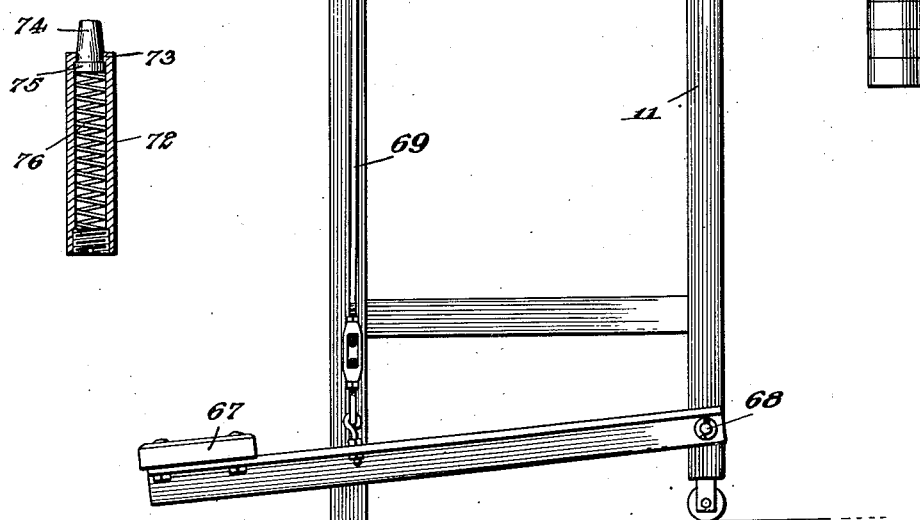
Fig. 3 is a sectional view taken substantially along the line 3—3 of Figure 4.

Referring now to Figs. 3 and 4, the actual stenciling operation is made in the usual manner by the application of a small quantity of a suitable vitreous enamel preparation to the upper surface of the screen and by moving the screen bodily in its own plane in one direction or the other across the surface of the article A with which it is in rolling contact. During such oscillation of the screen, the stationary squeegee blade S' forces the coloring material through the pervious portions of the screen and onto the surface of the article. The article is caused to rotate by virtue of its tractional engagement with the screen S during the movement of the latter. Upon completion of each stenciling operation, it is necessary that the squeegee be elevated from the enamel preparation to clear the same prior to movement of the screen to its extreme position so that upon lowering of the squeegee into contact with the screen, prior to the return movement of the latter, the enamel preparation thereon will occupy a position in advance of the squeegee. Heretofore in machines of this type, this clearing operation of the squeegee from the enamel preparation has been dependent upon the skill and judgment of the operator. In the present instance the clearing operation is facilitated by the provision of a pair of abutments which limit the movement of the stencil screen assembly shortly after completion of each decorating operation and prior to arrival of the same at the extreme limit of its stroke in either direction. These abutments are best illustrated in Figs. 3, 4 and 7. Each abutment is in the form of a bracket 70 provided with a slotted base 71 by means of which the bracket is adjustably secured to the table 10 on either side thereof. A tubular portion 72 extends upwardly from the base 71 at the forward end thereof. The upper end of the tubular portion 72 is flanged inwardly as at 73 (Fig. 7) and a plug-shaped member 74, which is the abutment proper, projects upwardly therefrom and is retained in the tubular portion of the bracket by means of an integral lower flange 75. The abutment proper is normally urged into its extended position by means of a coil spring 76 contained within the tubular portion 72. The member 74 is capable of telescopic movement into the tubular portion against the action of the spring 76. A pair of abutment-engaging arms 77 extend rearwardly from opposite ends of the cross-head 37 and occupy a common plane slightly above the upper ends of the tubular portions 72 of the brackets 70 but below the upper ends of the abutments proper carried thereby. The abutments proper are thus directly in the path of the arms 77 and the brackets 70 are adjusted on the table 10 in such a manner that the arms 77 will engage the members 74 (Fig. 4) after the decoration has been applied to the article A by the screen S, but prior to movement of the screen assembly 14 to either of its extreme positions as determined by either limit stop 39.

In the operation of the apparatus, when the arms 77 engage the abutments 74 after completion of each stenciling operation, the operator depresses the treadle 67 and raises the stencil screen assembly by tilting the same about the axis of the shaft 13 as previously described. The same operation may be accomplished by employing either of the manually operable levers 63 but in actual practice these levers are not frequently used. Upon such elevation of the assembly 14, the stencil screen S is raised from contact with the decorated article A in order that the same may be removed from the machine and another article substituted in its stead. Simultaneously with or succeeding the operation of substitution of an undecorated article in the machine, and with the stencil screen assembly 14 still in its elevated position, the operator moves the screen assembly into its limiting position with the crosshead 37 in engagement with either of the limit stops 39. This last operation may be effected simultaneously with a lowering movement of the entire screen assembly to the dotted line position shown in Fig. 5 with the side portion of the frame 27 resting upon the bearing blocks 61 and with the abutment 74 in its telescoped position within the tubular portion 72 of the bracket 71. During such lowering operation, the squeegee is returned to its position in contact with the stencil screen with a sufficient amount of the enamel preparation in the form of a puddle occupying a position on the screen ahead of the squeegee and ready for the next stenciling operation.

Modifications may be resorted to within the spirit and scope of the appended claims.

I claim:

1. A stenciling apparatus for decorating the curved surfaces of articles comprising a horizontally oscillatable stencil screen, means for positioning an article against said screen with the curved surface thereof in tangential rolling line contact therewith, means for applying a decorating material through said screen to said surface upon oscillation of said screen, and means for elevating said screen from contact with said surface.

2. A stenciling apparatus for decorating the curved surfaces of articles comprising a horizontally oscillatable stencil screen, means for positioning an article against said screen with the curved surface thereof in tangential rolling line contact therewith, means for applying a decorating material through said screen to said surface upon oscillation of said screen, and means for tilting said screen about a horizontal axis to elevate the same from contact with said screen.

3. A stenciling apparatus for decorating the curved surfaces of articles comprising a stencil screen assembly including a horizontally oscillatable stencil screen, means for positioning an article having a curved surface to be decorated against said screen with said surface in tangential rolling line contact therewith, means for applying a decorating material through said screen to said surface upon oscillation of said screen, and means for tilting said stencil screen assembly about a horizontal axis to elevate said screen from contact with said surface.

4. A stenciling apparatus for decorating the curved surfaces of articles comprising a supporting beam tiltable about a horizontal axis, a horizontally oscillatable radius arm pivotally secured to said beam and tiltable therewith, a stencil screen carried by the free end of said arm, means for positioning an article against said screen with the curved surface thereof in tangential rolling line contact therewith, means for applying a decorating material through said screen to said surface upon oscillation of said screen, and means for tilting said supporting beam to elevate said screen from contact with said surface.

5. A stenciling apparatus for decorating the curved surfaces of articles comprising a supporting beam tiltable about a horizontal axis, a horizontally oscillatable radius arm pivoted to said beam and tiltable therewith, a stencil screen carried by the free end of said arm, means for positioning an article against said screen with the curved surface thereof in tangential rolling line contact therewith, means for applying a decorating material through said screen onto said surface upon oscillation of said screen, and a pivoted lever adapted upon tilting movement about its fulcrum to engage said beam and tilt the same to elevate said screen above said surface.

6. A stenciling apparatus for decorating the curved surfaces of articles comprising a supporting beam tiltable about a horizontal axis, a horizontally oscillatable radius arm pivoted to said beam and tiltable therewith, a stencil screen carried by the free end of said arm, means for positioning an article against said screen with the curved surface thereof in tangential rolling line contact therewith, means for applying a decorating material through said screen onto said surface upon oscillation of said screen, a manually operable pivoted lever having an arm provided with a roller adapted to engage said beam and tilt the same upon movement of said lever about its fulcrum, and a foot treadle for actuating said lever.

7. A stenciling apparatus for decorating the curved surfaces of articles comprising a supporting beam tiltable about a horizontal axis, a horizontally oscillatable radius arm pivoted to said beam on one side of said axis and extending over the same and being tiltable with said beam, a stencil screen carried by the free end of said radius arm, a counterweight secured to said beam adjacent the pivotal connection between said beam and radius arm, means for positioning an article against said screen with the curved surface thereof in tangential rolling line contact therewith, means for applying a decorating material through said screen onto said surface upon oscillation of said screen, and means for tilting said beam to elevate said screen from said surface.

8. A stenciling apparatus for decorating the curved surfaces of articles comprising a horizontally oscillatable stencil screen, means for supporting an article against said screen with the curved surface thereof in rolling tangential line contact therewith, a squeegee in contact with said screen for forcing decorating material through said screen onto said surface upon oscillation of said screen, means for elevating said screen from contact with said surface, and means operable upon elevation of said screen for elevating said squeegee from contact therewith.

9. A stenciling apparatus for decorating the curved surfaces of articles comprising a horizontally oscillatable stencil screen, means for supporting an article against said screen with the curved surface thereof in rolling tangential line contact therewith, a squeegee in contact with said screen for forcing decorating material through said screen onto said surface upon oscillation of said screen, means for elevating said screen from contact with said surface, and means operable upon elevation of said screen for automatically elevating said squeegee from contact therewith.

10. A stenciling apparatus for decorating the curved surfaces of articles comprising a horizontally oscillatable stencil screen, means for supporting an article against said screen with the curved surface thereof in tangential rolling line contact therewith, a squeegee for forcing decorating material through said screen onto the article upon oscillation of said screen, a horizontal arm carrying said squeegee and adapted to hold the same against said screen, said arm being tiltable about a horizontal axis to elevate said squeegee from said screen, means for elevating said screen from contact with said surface, and means operable upon elevation of said screen for tilting said arm.

11. A stenciling apparatus for decorating the curved surfaces of articles comprising a supporting beam tiltable about a horizontal axis, a horizontally oscillatable radius arm pivotally secured to said beam and tiltable therewith, a stencil screen carried by the free end of said radius arm, means for positioning an article against said screen with the curved surface thereof in tangential rolling line contact therewith, a squeegee arm independently tiltable about a horizontal axis, a squeegee carried by said arm and normally engaging said screen to apply decorating material through said screen onto said surface upon oscillation of said screen relative to the squeegee, means for tilting said supporting beam to elevate said screen from said surface, and means operable upon tilting movement of said beam for tilting said squeegee arm to elevate said squeegee from said screen.

12. A stenciling apparatus for decorating the curved surfaces of articles comprising a supporting beam tiltable about a horizontal axis, a horizontally oscillatable radius arm pivoted to said beam and tiltable therewith, a stencil screen carried by the free end of said radius arm, means for positioning an article against said screen with the curved surface thereof in tangential rolling line contact therewith, a squeegee arm carried by said beam and independently tiltable about a horizontal axis, a squeegee carried by said squeegee arm in contact with said screen and movable upon tilting of said squeegee arm to an elevated position out of contact with said screen, means for tilting said beam to elevate said screen from the surface of said article, and an abutment positioned in the path of said squeegee arm for tilting the same upon tilting movement of said beam.

13. A stenciling apparatus for decorating the curved surfaces of articles comprising a supporting beam tiltable about a horizontal axis, a horizontally oscillatable radius arm pivotally secured to said beam and tiltable therewith, a stencil screen carried by the free end of said radius arm, means for positioning an article against said screen with the curved surface thereof in tangential rolling line contact therewith, a squeegee arm carried by said beam and independently tiltable about a horizontal axis, a squeegee carried by said squeegee arm on one side of said last mentioned axis and normally in contact with said screen and movable upon tilting of said squeegee arm to an elevated position out of contact with said screen, means for tilting said beam to elevate said screen from the surface of said article, and an abutment adapted to engage said squeegee arm on the other side of said last mentioned axis upon tilting movement of said beam to tilt said squeegee arm.

14. An apparatus for decorating curved surfaces of articles comprising a horizontally oscillatable radius arm, a horizontally disposed stencil screen mounted on the free end of said arm and movable in an arcuate path, means for positioning an article against said screen with the curved surface thereof in rolling line contact therewith, said arm being capable of tilting movement about a horizontal axis to elevate said screen from said article, a squeegee positioned in contact with said screen for forcing decorating material through said screen onto the article upon oscillation of said screen, and means operable upon tilting movement of said radius arm for elevating said squeegee from contact with the screen.

15. An apparatus for decorating curved surfaces of articles comprising a radius arm capable of oscillation about an axis perpendicular to said arm, a horizontal stencil screen carried by said arm at the free end thereof and bodily movable back and forth in its own plane upon oscillation of said arm, means for positioning an article in contact with said screen with the curved surface thereof in horizontal tangential line contact therewith, means for tilting said arm and axis to elevate said screen from said article, a squeegee in contact with said screen for forcing decorating material through the same onto said article upon oscillation of said screen, means operable upon tilting movement of said arm and axis for elevating said squeegee from contact with the screen, and an abutment positioned in the path of movement of said screen and in the horizontal plane thereof for limiting the horizontal oscillation of said screen, said screen upon elevation thereof being movable over said abutment.

16. An apparatus for decorating the surfaces of articles comprising, means for rotatably supporting an article, a rockable support, a screen carried by said support and rockable therewith from a position in rolling contact with the article to a position out of contact therewith, said screen being capable of oscillation about an axis perpendicular to said support in all positions thereof, a squeegee in contact with said screen, means for moving said squeegee out of contact with said screen upon movement of said screen out of contact with said article, and means for restricting the extent of oscillation of said screen when in contact with said article.

17. An apparatus for decorating the surfaces of articles comprising means for rotatably supporting an article, a rockable support movable from a horizontal position to an inclined position, a stencil screen carried by said support and rockable therewith from a horizontal position in rolling contact with said article to an inclined position out of contact therewith, said screen being capable of oscillation about an axis perpendicular to said support in all positions thereof, a squeegee in contact with said screen, means for moving said squeegee out of contact with said screen upon movement of said screen to its inclined position, and means for restricting the extent of oscillation of said screen when in contact with said article.

18. An apparatus for decorating the surfaces of articles comprising means for rotatably supporting an article, a rockable support movable from a horizontal position to an inclined position, a radius arm pivoted to said support for oscillation about an axis perpendicular thereto in all positions thereof, a stencil screen carried by said radius arm and movable upon rocking movement of said support from a position in rolling contact with the article to a position out of contact therewith, a squeegee in contact with said screen, means for moving said squeegee out of contact with the screen upon movement of said support to its inclined position, and means for restricting the extent of oscillation of said screen when in contact with the article.

19. An apparatus for decorating articles comprising a rockable support movable from a normally horizontal position to an inclined position, a radius arm pivoted to said support for oscillation about an axis perpendicular to said support within limits, a stencil screen carried by said radius arm, means for positioning an article against said screen in the normal position of said support, a squeegee in contact with said screen for forcing decorating material through said screen onto the article upon oscillation of said screen, said squeegee being movable out of contact with the screen upon inclination of said support, and means for restricting the extent of oscillation of the radius arm in the normal position of said support.

THEODORE H. SLOAN.